Dec. 6, 1955    C. H. HALE    2,726,268
SYNTHESIS OF OXYGENATED ORGANIC COMPOUNDS
Filed Oct. 7, 1950
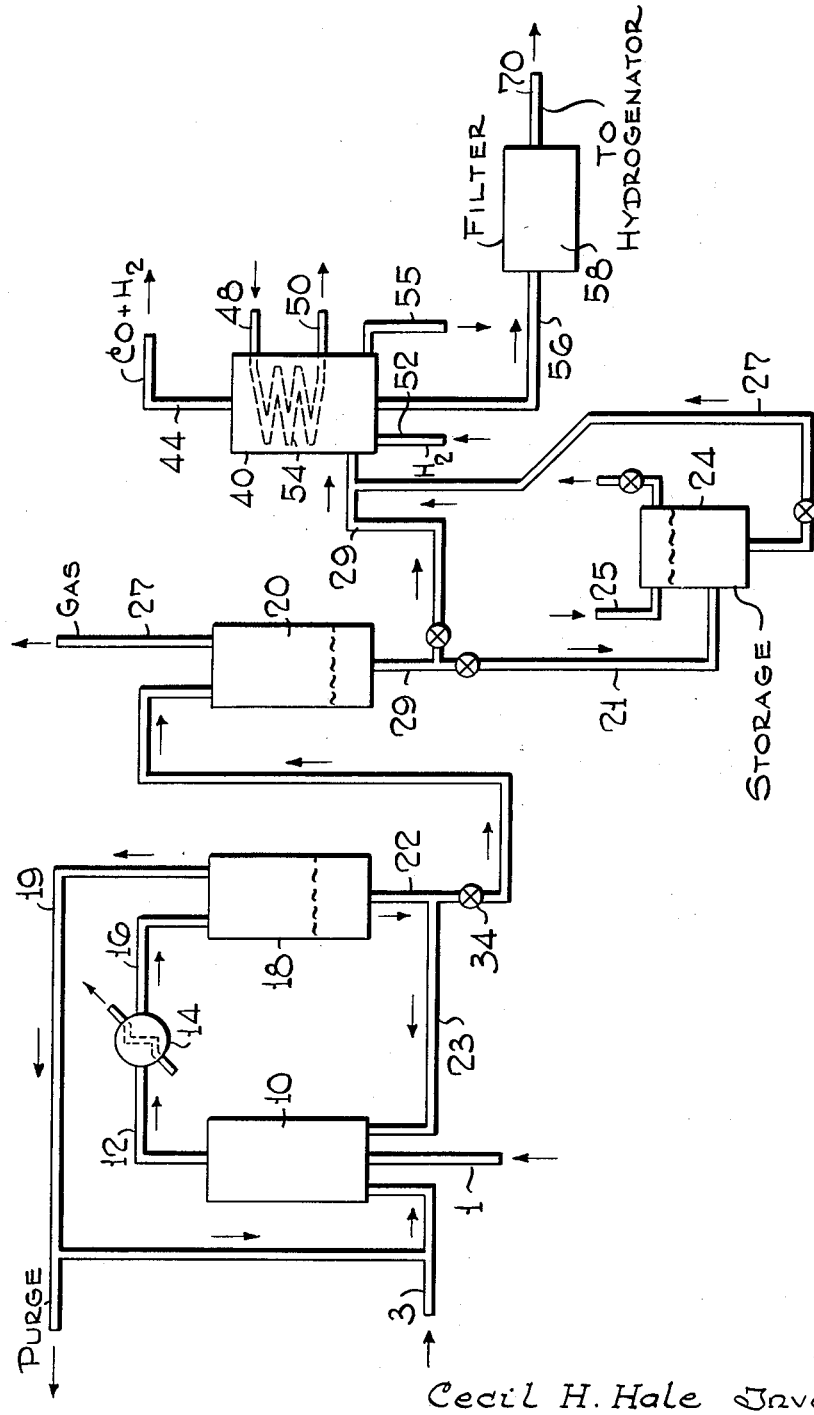
Cecil H. Hale Inventor
By J. Cushman  Attorney United States Patent Office 2,726,268
Patented Dec. 6, 1955

2,726,268

SYNTHESIS OF OXYGENATED ORGANIC COMPOUNDS

Cecil H. Hale, Baton Rouge, La., assignor to Esso Research and Engineering Company, a corporation of Delaware Application October 7, 1950, Serial No. 188,941

1 Claim. (Cl. 260—604)

The present invention relates to an improved synthesis process for the production of oxygenated organic compounds by reacting organic compounds having an olefinic double bond with gas mixtures containing carbon monoxide and hydrogen at high pressures and elevated temperatures in the presence of suitable catalysts. More particularly, the invention is concerned with an improved method for removing dissolved metal carbonyl and carbon monoxide from the oxygenated synthesis product prior to storage or further treatment such as catalytic hydrogenation.

The synthesis of oxygenated organic compounds from olefinic compounds and mixtures of CO and $H_2$ is well known in the art. The olefinic starting material is reacted in the liquid state with CO and $H_2$ in the presence of a metal catalyst, usually an iron group metal catalyst such as a suitable cobalt compound. The reaction product consists essentially of organic carbonyl compounds, mainly aldehydes, having one carbon atom more per molecule than the olefinic feed material. The oxygenated product may be hydrogenated in a second catalytic stage to convert the aldehydes to the corresponding alcohols.

Practically all types of organic compounds having an olefinic double bond may be used as the starting material, including aliphatic olefins and di-olefins, cyclo-olefins, aromatics with olefinic side chains, oxygenated compounds having olefinic double bonds, etc. The metal catalyst may be present as a solid or in the form of an organic salt soluble in the olefinic feedstock. Suitable reaction conditions include temperatures of about 150–450° F., pressures of 100–300 atmospheres, hydrogen to carbon monoxide ratios of about 0.5–4.0:1, liquid feed rates of about 0.1–5.0 v./v./hr. and gas feed rates of about 1000–45,000 standard cubic feet of gas mixture per barrel of liquid olefinic feed.

Similar temperatures and pressures and conventional hydrogenation catalysts such as nickel, copper, tungsten, oxides or sulfides of group IV and group VIII metals, etc., may be employed in the second stage for the hydrogenation of the carbonyl compounds.

The iron group metals used as catalysts in the first stage of the process react with CO to form metal carbonyls. This is particularly true for cobalt, the preferred and most active oxygenation catalyst. This cobalt carbonyl which dissolves in the liquid oxygenated product tends to decompose under low CO partial pressures even at relatively low temperatures and very rapidly at elevated temperatures, to form free CO and insoluble metal cobalt or compounds. Solid cobalt so separated seriously interferes with the further processing of the oxygenated reaction product because it may cause excessive pressure drop in the equipment due to deposition of cobalt in lines and vessels or it may deactivate the hydrogenation catalyst of the second stage by surface deposition of cobalt. Since cobalt carbonyl slowly decomposes under low CO partial pressures even on standing at atmospheric pressure it should be removed as soon upon the formation of the oxygenated product as possible.

Prior to the present invention it has been suggested to remove cobalt carbonyl from the oxygenated product by treating with hydrogen at relatively high pressures and elevated temperatures in vessels packed with an inert solid on which the separated cobalt is deposited and from which a substantially carbonyl-free liquid product may be withdrawn, the liberated CO being removed with the hydrogen used for treating. These procedures, while effective, require relatively long residence time, usually in excess of one hour in the decobalting vessel at high temperatures, conditions which are conducive to aldehyde loss by formation of higher molecular weight derivatives. In addition, difficulties due to plugging of the decobalting vessel have been encountered. When shorter residence times are employed, the cobalt removal may be incomplete.

It has also been suggested that the total liquid effluent from the carbonylation stage be subjected to thermal treatment at temperatures high enough to maintain a satisfactorily rapid rate of metal carbonyl decomposition at relatively low pressures which are not higher than required just to prevent substantial vaporization of the liquid effluent. Heat for the decobalting is supplied through surfaces forming the walls of the catalyst decomposition chamber. Thus, it has been demonstrated that heat for decobalting may be added by means of passage of the total liquid effluent through a double pipe steam heater, wherein steam passes through the outer walls and product through the inner surfaces. Though this type of operation is initially satisfactory, it has the disadvantage that metallic cobalt formed by the decomposition of cobalt carbonyl not only is precipitated in the tube but also tends to deposit out on the hot surfaces. Eventually this causes plugging up of the tube, which is preferably of relatively narrow dimensions to facilitate rapid heat transfer throughout the liquid passing therethrough. Because of this plugging tendency, decobalting is usually carried out in two or more interchangeable units, and the primary product is switched from one unit to another as the one on stream becomes plugged up and requires cleaning out. Removal of the deposited cobalt often is a difficult process, because during extended heating the soft cobalt metal deposit originally formed is converted into a hard scale which requires drilling to remove from the tube walls. Also, as the metal builds up along the walls, heat transfer becomes increasingly less efficient, and this results in decreased carbonyl removal, which in turn means that the cobalt carbonyl will be decomposed in the hot coils in the hydrogenation system, resulting in plugging and in inactivation of the hydrogenation catalyst.

In whatever manner the cobalt is removed from the primary carbonylation reactor it has in the past been standard procedure to pass the extraneous aldehyde product containing aldehyde and dissolved cobalt carbonyl and the compounds and complexes of cobalt, all in solution and all in the pressure existing in the carbonylation reactor, to a high pressure separator. In the latter which is a conventional cylindrical vessel the dissolved gases are allowed to separate and these gases which may consist entirely of synthesis gas and some cobalt carbonyls may be recycled to the carbonylation reactor. The liquid product is then passed to a low pressure separator wherein the pressure is reduced from about 3000 pounds to as low as 10 pounds in order to free the liquid product from maximum amount of gas. The product from the low pressure separator is sent to the decobalting plant.

It has been noticed, however, that the effluent from the thermal decobalting operation in a great many cases was not entirely free from dissolved cobalt and that the cobalt carbonyls and hydrocarbonyls are either not completely decomposed to the metal or that other forms of cobalt such as possibly cobalt soaps, or salts are left in solution to the extent of as much as 0.1–0.2% of the effluent from the decobalter. The presence of this cobalt in the effluent from the decobalter, which in turn is sent to the hydrogenation step, is extremely harmful because under the high temperature existing in the latter operation, that is, in the operation wherein aldehydes are converted to alcohols at temperatures of 400 to 550° F. and pressures of about 3000 pounds, any cobalt in solution is decomposed in the heating coils or in the catalyst in the reactor, therefore, fouling the lines and serving to inactivate the hydrogenation catalyst.

It has also been customary in commercial operation to withdraw the effluent from the carbonylation reactor and, after the passage of this effluent through the low pressure separator, the aldehyde product containing in solution cobalt carbonyl, is sent to a storage plant to await decobalting as needed. This is particularly true when the aldehyde synthesis reactors have a considerably higher capacity than the smaller decobalting equipment. The aldehyde product is usually stored at atmospheric pressures, possibly in the presence of an inert gas and it has been observed that when the stored material is later decobalted the tendency for cobalt to remain in solution after the decobalting operation has been especially pronounced.

The present invention overcomes these difficulties and affords various additional advantages. These advantages, the nature of the invention and the manner in which it is carried out will be fully understood from the following description thereof, with reference to the accompanying drawing which shows a semi-diagrammatic view of apparatus adapted to carry out the invention.

In accordance with the present invention the effluent from the carbonylation reactor at no time is allowed to reach pressures in the vicinity of atmospheric and at all times a positive hydrogen pressure is maintained. This, moreover, has particularly been found to be essential when the effluent from the low pressure separator is maintained in storage prior to decobalting. It has been found desirable to keep cobalt carbonyl-containing aldehyde product under pressures of at least 25 pounds of hydrogen at all times prior to decobalting and also, it has been found that better decobalting is obtained when the aldehyde product is decobalted as soon as possible after its formation in the carbonylation reactor. Storage of the aldehyde product prior to decobalting of 24 hours at atmospheric pressure has been found to be exceptionally harmful in that this material, on subsequent thermal decobalting operation was found to contain a large amount of undecomposed cobalt-containing material.

In accordance, therefore, with the present invention, the total liquid effluent from the carbonylation stage is passed through a high pressure separator and then through a low pressure separator wherein the pressure is not allowed to fall below 25 pounds of hydrogen. The product from this separator after separation of gases, and containing dissolved cobalt carbonyl is then passed to the decobalter.

In a second embodiment of the present invention wherein it is necessary to pass the aldehyde product prior to decobalting to a storage plant, the latter is at all times maintained at an elevated pressure. Thus, within the storage plant the undecobalted aldehyde product is maintained under a hydrogen pressure of 25 to 200 pounds, preferably 50 to 200 pounds.

This pressure may be maintained either by synthesis gases, that is a gas consisting of hydrogen and carbon monoxide or the aldehyde product may be kept under hydrogen alone.

Prior to the present invention when it was first determined that thermal decobalting at pressures of atmospheric to 450 pounds and under temperatures of 240° F., did not completely remove cobalt from the aldehyde product, it was thought that the decomposition of carbonyls and hydrogen carbonyls would be promoted by the removal of gas pressure. The basis of this belief was that the reversal of the reaction for the formation of cobalt hydrocarbonyl would be promoted by the removal of the gases $$2Co + H_2 + 8CO \rightleftharpoons 2CoH(CO)_4$$

It has now unexpectedly been found that removal of the hydrogen pressure actually decreases the formation of metallic cobalt instead of increasing it.

Having set forth its general nature, the invention will be better understood from the following more detailed description in which reference will be made to the accompanying drawing.

Referring now in detail to the figure, the system illustrated herein essentially comprises a carbonylation reactor 10, a high pressure separator 18, a low pressure separator 20, a decobalter 40 and a storage vessel 24 whose function and cooperation will be forthwith explained, using the removal of cobalt carbonyl from an aldehyde synthesis reaction product having an average of 8 carbon atoms per molecule as an example. It should be understood, however, that this system may be applied to the treatment of heavier or lighter oxygenation products containing the same or a different material composition.

In operation, the liquid olefinic feed stock having an average of about 7 carbon atoms per molecule and a gas mixture containing CO and H₂ in the approxiamte ratio of 1:1 are introduced respectively through lines 1 and 3 into the bottom of reactor 10. The catalyst, preferably in the form of a cobalt salt soluble in the feed, such as cobalt naphthenate, stearate, oleate, etc., may be added to the liquid feed in concentrations of about 0.1–.3% by weight. If desired, reactor 10 may be provided with a bed of cobalt catalyst supported on an inert carrier such as silica gel, pumice or the like; on the other hand, 10 may be free of cobalt or packing.

Reactor 10 is operated at conventional carbonylation conditions including temperatures of about 200–400° F., pressures of about 2500–3500 lbs. per sq. in., a gas feed rate of about 3000–40,000 standard cu. ft. per barrel of liquid feed and a liquid feed throughput of about 0.2 to 2 volumes per volume of reactor space per hour. The reaction products consisting of liquid oxygenated products containing about 0.05 to 0.3% by weight of dissolved cobalt mainly as cobalt carbonyl are removed, together with unreacted gas, through line 12, cooled to about 80–120° F. in cooler 14 and passed through line 16 to a high pressure liquid-gas separator 18. Gas separated in separator 18 is withdrawn through line 19 and may be recycled to line 1 for reuse in reactor 10. The pressure in separator 18 is about the same order of magnitude as that within reactor 10.

The liquid separated in separator 18, still at the pressure of reactor 10, is withdrawn downwardly through line 22 provided with pressure release valve 34. A portion of the cooled liquid may be recycled to reactor 10, via line 23 to control the temperature of the synthesis. The balance of liquid product is now under a low pressure of about 10 to 50 p. s. i. g. at which the major portion of the previously dissolved gas comprising H₂, CO and cobalt carbonyl, etc., is released. This liquid-gas mixture is separated in low pressure separator 20 from which the gas is withdrawn through line 27 and the liquid product comprising mainly aldehyde and cobalt compounds and complexes, principally cobalt carbonyl or hydrocarbonyl and probably some water formed as the result of secondary reactions such as acetal and aldol formation in reactor 10, is passed to decarbonylation unit 40 through line 29. Decobalter 40 consists essentially of a vessel comprising a relatively elongated tube and containing a steam coil whose diameter is small in relation to the diameter of vessel 40. Preferably the coil may be of the pancake type.

In operation, liquid aldehyde product containing dissolved cobalt carbonyl is supplied to vessel 40 through line 29 at a temperature of about 50 to 250° F. and a hydrogen pressure of about 25 to 200 pounds p. s. i. g. to fill vessel 40 substantially completely. Heating steam is supplied through line 48 and withdrawn through line 50 in a manner adequate to heat the liquid within vessel 40 to about 300 to 450° F. If desired, carbon monoxide-free hydrogen or an inert gas may be supplied to the bottom of vessel 40 through line 52 to aid in the stripping and removal of carbon monoxide resulting from the decomposition of the cobalt carbonyl.

Carbonyl decomposition proceeds rapidly within residence time of about 5 to 60 minutes, preferably 15-30 minutes, which residence times are not conducive to aldehyde condensation or polymerization. Precipitate of metal which collects in the bottom of vessel 40 may be withdrawn through line 55. While some cobalt material may be deposited on heating coil 54, the free cross section area of vessel 40 is so much larger than that of the coil that plugging does not arise. Also any cobalt deposit on the surface of heating coil 54 is readily removed.

Liquid aldehyde product, substantially free of cobalt carbonyl and carbon monoxide is withdrawn through line 56. The withdrawn liquid may be freed of any cobalt metal in filter 58 and then passed to storage through line 70 or passed directly to a hydrogenation plant. Separated gas containing only a small amount of vaporized liquid is withdrawn overhead from vessel 40 through line 44 and this gas may be employed elsewhere in the system for hydrogenation if desired. While hydrogen is preferable whenever a gas is to be used for stripping and reducing of the carbon monoxide partial pressure present in the decobalter, other gases inert to the aldehyde may be employed for example, methane, nitrogen, etc.

In the embodiment of the invention wherein it is desired or necessary to send the aldehyde product from the low pressure separator 20 to a storage vessel prior to decobalting, wherein the greatest utility of the invention is realized, the aldehyde product from low pressure separator is preferably passed through lines 29 and 21 to storage vessel 24 within which a positive hydrogen pressure of at least 25 pounds, preferably 50 to 200 pounds of hydrogen is maintained. Gases, for instance, hydrogen, or hydrogen and carbon monoxide may be supplied to vessel 24 through line 25. Also, if desired, no additional gas need be added, but pressure and temperature conditions within 24 are maintained such that the gases dissolved in the stored aldehyde product are sufficient to give the desired $H_2$ pressures. It is important that the pressure within storage vessel 24 does not approach atmospheric. From storage vessel 24 the aldehyde product containing cobalt carbonyl is then passed as needed to the decobalting plant for decobalting in the manner described, the stream passing through line 27 to line 29.

The invention will be further illustrated by the following specific example which illustrates the results obtained when the effluent from the aldehyde reactor is first allowed to come to atmospheric pressure prior to decobalting and comparing with results obtained when the aldehyde reactor effluent at all times is maintained under a positive hydrogen pressure.

In a series of batch experiments, numerous attempts were made to effect thermal decobalting in steel bombs at various temperatures, with results as shown below. Samples of aldehyde product containing about 0.18% cobalt in solution were withdrawn from the low pressure separator section of a 100 B/D pilot plant and were removed into bombs under the pressure of the dissolved gas, the samples being under approximately 30 lbs. gas pressure. Portions of these samples were decobalted under different conditions of pressure and after different conditions of storage, as shown below. Decobalting after storage was carried out in 250 cc. stainless steel bombs by heating for one hour at 320–340° F.

*Decobalting of stored aldehyde product*

RUN A

| Sample | Storage Time | Storage Container | Gas Pressure in Storage | P.s.i.g. $H_2$ Added to Decobalter | P.p.m. Co. in Product |
|---|---|---|---|---|---|
| 1 | none | | | | 0 |
| 2 | 2 hrs | glass | 15# natural gas | | 460 |
| 3 | 30 hrs | sample bomb | 25# $H_2$+CO | 25 | 1 |
| 4 | 24 hrs | glass | 15# natural gas | 25 | 480 |
| 5 | do | sample bomb | 15# $H_2$+CO | | 250 |

RUN B

| | | | (Sample from L. P. Separator less than 25#) | | |
|---|---|---|---|---|---|
| 6 | | | | | 110 |
| 7 | 2 hrs | sample bomb | 35# $H_2$+CO | 25 | 23 |
| 8 | do | glass | 15# $N_2$ | 25 | 160 |

RUN C

| 9 | | | | 25 | 1 |
|---|---|---|---|---|---|
| 10 | 4 hrs | glass | 15# $N_2$ | 25 | 10 |
| 11 | 5 hrs | do | 15# $N_2$ | | 200 |
| 12 | 4 days | sample bomb | 40# $H_2$+CO | | 5 |
| 13 | do | do | 40# $H_2$+CO | 25 | 3 |
| 14 | 3 days | glass | 15# $N_2$ | | 450 |
| 15 | do | do | 15# $N_2$ | 25 | 100 |

The above data show that when the aldehyde samples were stored under pressure of a hydrogen-containing gas at a pressure of 25# or more, decobalting could readily be accomplished even after 4 days of storage. However, when the pressure was reduced and storage of samples undertaken at atmospheric pressures, even a few hours rapidly increased the difficulty of subsequent decobalting. These facts may indicate that the cobalt comes out of the aldehyde synthesis reactor in a form that can readily be decomposed by heat to the metal, but that storage for a short time at atmospheric pressure allows the cobalt to be converted to a form that does not precipitate metallic cobalt on heating. An equilibrium reaction that would be affected by $H_2$ may be as follows:

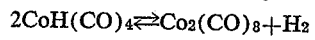

Thus, a possible explanation is that cobalt hydrocarbonyl, the active catalyst species, is decomposed by heat to metallic cobalt, but that the carbonyl in the presence of moisture decomposes to the oxide or carbonate which would in turn react with acids present in the aldehyde product (i. e. acids resulting from secondary reactions or from the catalyst soaps), and remain in solution. It will be observed that when hydrogen is added to the decobalting bomb cobalt removal is usually improved, though never to the point attained when the aldehyde product is not allowed to come to atmospheric pressures.

It will be observed that the pressures must be exerted by hydrogen-containing gas, and that even when aldehyde product is brought down to atmospheric pressures, if it is under hydrogen, decobalting is less difficult than if under nitrogen or natural gas. (Run A–5.)

While the foregoing description and exemplary operation have served to illustrate specific applications and results, the invention is not limited thereto. Thus, though the principal utility of the present invention is when it is necessary or desirable to store the cobalt-containing aldehyde synthesis product, it is not limited thereto. Also, other means of decobalting than those described may be employed.

What is claimed is:

In the process whereby aldehydes are produced from olefins by reaction of the latter with carbon monoxide, hydrogen, and a cobalt carbonylation catalyst in a primary carbonylation zone and wherein an aldehyde product containing substantial quantities of dissolved cobalt carbonyl is withdrawn from said carbonylation zone, is separated from carbon monoxide and hydrogen gas under lowered pressure in a separation zone, and is subsequently passed to a thermal decobalting zone, the improvement which comprises increasing the effectiveness of the subsequent thermal decobalting by passing said aldehyde product freed of gas from the separation zone into a storage zone, introducing into said storage zone a hydrogen- and carbon monoxide-containing gas in sufficient quantity to maintain a positive gas pressure of 25–200 p. s. i. g. therein, and subsequently passing said aldehyde product into the thermal decobalting zone wherein said product is heated to an elevated temperature.

References Cited in the file of this patent

UNITED STATES PATENTS

| | | |
|---|---|---|
| 2,504,682 | Harlan | Apr. 18, 1950 |
| 2,509,878 | Owen | May 30, 1950 |
| 2,564,456 | Vlugter et al. | Aug. 14, 1951 |
| 2,571,160 | Parker et al. | Oct. 16, 1951 |
| 2,595,096 | Parker | Apr. 29, 1952 |